United States Patent
Kolev et al.

(10) Patent No.: US 6,356,753 B1
(45) Date of Patent: Mar. 12, 2002

(54) MANAGEMENT OF AUTHENTICATION AND ENCRYPTION USER INFORMATION IN DIGITAL USER TERMINALS

(76) Inventors: Javor Kolev, 101 Ludlow Ct., Cary, NC (US) 27513; Aaron Cubbage, 105 Embassy Ave., Nashville, NC (US) 27856

( * ) Notice: Subject to any disclaimer, the term of this patent is extended or adjusted under 35 U.S.C. 154(b) by 0 days.

(21) Appl. No.: 09/065,475

(22) Filed: Apr. 24, 1998

(51) Int. Cl.[7] .............................................. H04M 1/66
(52) U.S. Cl. ...................................... 455/411; 455/575
(58) Field of Search ................................. 455/410, 411, 455/422, 556, 557, 566, 575, 435; 380/23; 340/825.34, 5.31, 5.32

(56) References Cited

U.S. PATENT DOCUMENTS

| | | | |
|---|---|---|---|
| 5,390,252 A | * | 2/1995 | Suzuki et al. ................ 455/411 |
| 5,987,133 A | * | 11/1999 | Aisaka ......................... 380/23 |
| 6,052,604 A | * | 4/2000 | Bishop, Jr. et al. .......... 455/411 |
| 6,091,952 A | * | 7/2000 | Xu et al. ..................... 455/432 |

OTHER PUBLICATIONS

WO 97 38542 A, Ericsson Inc., Display and User Interface Operation for Use in a Multiple Server Environment, Oct. 16, 1997, p. 5, line 14–p. 8, line 23, table 1, figure 1.

EP 0 779,760, Nokia Mobile Phones Ltd., Method for Indicating Enciphering of Data Transmission Between a Mobile Communication Network and a Mobile Station, Jun. 18, 1997, col. 4, line 2–col. 6, line 14; col. 9, line 32–col. 10, line 3, figure 5.

Mouly M. et al., "Security Management" GSM System for Mobil Communications, pp. 477–493,568–576, XP002037920.

WO 98 07288, A, Ericsson Inc., Method and Apparatus for Establishing Activiation Date for a Cellular Telephone, Feb. 19, 1998, document cited as defining general state of the art which is not considered to be of particular relevance.

European Patent Office, PCT International Search Report, Oct. 8, 1999.

GSM 02.07 Version 5.4.0 Jan. 1998, section B.1.26.

GSM 02.09 Version 5.1.1 Dec. 1997, section 3.3.3.

\* cited by examiner

*Primary Examiner*—Doris H. To
(74) *Attorney, Agent, or Firm*—Coats & Bennett, P.L.L.C.

(57) ABSTRACT

The present invention provides methods and devices for controlling the authentication and ciphering procedures in digital communication devices. In the invention, a means for transmitting and receiving radio signals is connected with a processing unit. A. SIM is provided that contains authentication and ciphering information and is also connected with the processing unit. A memory module is provided that has a first memory location reserved for a authentication flag and a second memory location reserved for a ciphering flag. During operation, an authentication indicator is activated only when the communication device is authenticated during a system access. In addition, a ciphering indicator is activated when the communication device is encrypting data being sent and received from the digital wireless network.

60 Claims, 3 Drawing Sheets

MANAGEMENT OF AUTHENTICATION AND ENCRYPTION USER INFORMATION IN DIGITAL USER TERMINALS

NATURE OF THE INVENTION

The present invention relates generally to the management of authentication and encryption user information in digital user terminals and, more particularly, to methods and systems for providing real-time authentication and ciphering information and presenting it to a user.

BACKGROUND OF THE INVENTION

Prior art analog wireless communication systems were provided with a means to authenticate a communication device on the wireless network. The main deficiency of the communication devices that use these wireless networks is the inability to communicate the results of the authentication procedures to a user. While many communication devices that use the wireless network are authenticated on the wireless network, the user can never realize this because that information is not conveyed in a user friendly, real-time manner. As a result, the authentication procedures occur within the communication device and are invisible to a user of the communication device. Therefore, the user of the communication device never knows when the communication device is authenticated on the wireless communication network.

Providing encrypted radio communication is somewhat difficult, but not impossible, on analog wireless communication systems. Because of the difficulty in implementing the ciphering technology in these types of communication devices the technology is not often used in many communication devices. In addition, many analog, and digital for that matter, wireless communication systems do not support ciphering technology associated with communicating using ciphering. However, with the introduction of digital wireless technology the use of encryption for providing secure radio communication is growing. Digital wireless networks are capable of performing ciphering routines much easier and faster with digital wireless communication.

Both authentication and ciphering are among the main advantages of wireless digital communication systems. These features will be among the most visible features marketed to the consuming public. This is done because these features are designed to provide end users of the communication devices with powerful tools to eliminate fraud and provide secure communications. Cellular phone fraud is a worldwide problem and the industry loses millions of dollars every year as a result of such fraud. The communication industry and the technological development being done are dedicated to increasing the user confidence in the security and confidentiality capabilities of a wireless digital network. Therefore, a need exists in the digital wireless communication market for communication devices that provide authentication and ciphering features and present the results of those features to the user in a user friendly manner.

SUMMARY OF THE INVENTION

The disclosed invention is related to radio resource and mobility management operations performed by a communication device that is connected to a digital wireless network. In particular, it is related to authentication, which is the mobility management procedure for subscription verification and confirmation. Unless a communication device is authenticated on a digital wireless network, the digital wireless network will not allow the communication device to conduct radio communication. Normally, authentication procedures are performed by sending a plurality of radio signals between the digital wireless network and the communication device. The invention also relates to ciphering which is a radio resource procedure that provides confidentiality for both the subscriber identity and for the data being sent and received over the digital wireless network. The invention provides a method and a communication device that maintains and indicates the real-time status of these operations and reports their outcome to the user of the communication device.

The authentication and ciphering procedures that are performed by the communication device are controlled by the digital wireless network. In general, any communication device must be able to respond to either an authentication or ciphering procedure utilizing the corresponding technical specifications of the digital wireless network. Both procedures are normally initiated by the network as a result of the communication device requesting a system access. In the most typical signaling cases, the communication device will request a system access, e.g., a call origination or a location update.

During operation when these transactions occur, the digital wireless network requires subscription verification, by passing data to be processed by the serial in-line module, commonly referred to as a SIM, in the communication device. The communication device will then send the results of the data that is processed in the SIM to the digital wireless network for validation. If the user is authenticated, the signaling between the communication device and the digital wireless network will proceed, normally in an encrypted mode. The digital wireless network and the communication device agree upon what encryption parameters to use and the digital wireless network is in control of turning ciphering on and off. Therefore, the communication device needs to be able to provide a user-friendly method of notifying a user of the communication device when it is authenticated, and ciphering information being sent over the digital wireless network.

The disclosed invention provides a real-time method of providing authentication and ciphering information to a user of a communication device. The disclosed method comprises the steps of providing a processing unit connected with a means for conducting radio communication over a digital wireless network; using a non-volatile memory, e.g., SIM connected with the processing unit for controlling authentication procedures and ciphering procedures during a system access; providing a memory module connected with the processing unit having a first memory location reserved for an authentication flag and a second memory location reserved for a ciphering flag; activating the authentication flag when the communication device is authenticated on the digital wireless network and the ciphering flag when the communication device is sending and receiving encrypted data over the digital wireless network; activating an authentication indicator when the authentication flag is activated by the processing unit; and activating a ciphering indicator when the ciphering flag is activated by the processing unit.

In the invention, the authentication indicator and the ciphering indicator may be selected from the group including a text message, an icon, a light, or an alphanumeric message generated by a display device. The authentication indicator and the ciphering indicator may also comprise an audio signal that is generated by an audio generation device that is connected with the processing unit. Generally, the authentication indicator and the ciphering indicator are configurable to reflect the status of the authentication flag or the ciphering flag immediately or at the user's request. The authentication flag and the ciphering flag are configurable to reflect a single system access or a whole working session.

During operation of the communication device, the authentication flag is assigned an authentication failed flag by the processing unit when the digital wireless network rejects an authentication procedure performed by the communication device. The authentication failed flag is stored permanently in the memory module until the communication device is turned off or the SIM is replaced. The communication device assigns the authentication flag and authentication success flag when the digital wireless network accepts an authentication procedure performed by the communication device. Generally, the authentication success flag remains active during a system access unless an authentication procedure fails during the current system access. In addition, normally, the authentication success flag is not reset as long as the communication device is served by the same digital wireless network during a current working session.

In addition, the preferred method allows the users of the communication device to check whether the digital wireless network has authenticated the communication device during a current working session. The communication device is also provided with a means for allowing a user to disable the processing unit from the handling real-time authentication information procedures and from activating the authentication flag. Also, the communication device is provided with a means for allowing the user to disable the processing unit from handling real-time ciphering information procedures and from activating the ciphering flag during a system access.

The present invention also discloses a communication device for conducting radio communication over a digital wireless network. The communication device comprises a processing unit connected with a means for sending and receiving radio signals over a digital wireless network; a dedicated memory, e.g., a SIM connected with the processing unit, said SIM containing authentication data and ciphering data; a memory module connected with a processing unit; a first memory location reserved in the memory module for an authentication flag, the authentication flag being activated when the digital wireless network has authenticated the communication device after performing an authentication procedure; a second memory location reserved in the memory module for a ciphering flag, said ciphering flag being activated when the communication device is encrypting data being sent and received over the digital wireless network; an authentication indicator connected with the processing unit, said authentication indicator being activated by the processing unit when the authentication flag is activated during a system access; and a ciphering indicator connected with the processing unit, said ciphering indicator being activated by the processing unit when the ciphering flag is activated during a system access.

In preferred embodiments of the disclosed invention, the authentication indicator or the ciphering indicator may be selected from the group including an icon, an alphanumeric message, a light, or a text message generated by a display device. In addition, the authentication indicator or the ciphering indicator may be comprised of an audio signal generated by an audio generation device that is connected with the processing unit. Both the authentication indicator and the ciphering indicator are configurable to reflect the status of the authentication flag or the ciphering flag immediately or at a user's request.

During operation of the communication device, the authentication flag is assigned an authentication failed flag by the processing unit when the digital wireless network rejects an authentication procedure from the communication device. The authentication failed flag is stored permanently in the memory module until the communication device is turned off or the SIM is replaced. In addition, the authentication flag is assigned an authentication success flag by the processing unit when the digital wireless network accepts an authentication procedure performed by the communication device. The authentication success flag remains active during a system access unless an authentication procedure fails during the current system access. In addition, the authentication success flag may remain active as long as the communication device is serviced by the digital wireless network during a current working session.

The communication device is also provided with a means for allowing a user to check whether the digital wireless network has authenticated the communication device during a current working session. As such, the communication device is also provided with a means for allowing the user to check whether the communication device is sending and receiving encrypted data over the digital wireless network. The communication device is also provided with a means for allowing a user to disable the processing unit from handling real-time authentication information and from activating the authentication flag. Likewise, the communication device is provided with a means for allowing a user to disable the processing unit from handling real-time ciphering information and from activating the ciphering flag during a system access.

DETAILED DESCRIPTION OF THE PREFERRED EMBODIMENTS

The present invention is related to radio resource and mobility management operations performed by user terminals or communication devices in a digital communication system. In particular, it is related to authentication, which is the mobility management procedure for subscription verification and confirmation, and to ciphering, which is a radio resource procedure that provides confidentiality for both the subscriber identity and data/voice communication. The invention provides a method and an arrangement within a communication device that maintains and indicates the status of the authentication and ciphering operations and provides the real-time results of those operations to the user. The preferred embodiments set forth below can be applied to communication devices designed to operate on all kinds of digital communication systems which feature authentication and ciphering, such as GSM and ACeS.

The authentication and ciphering procedures are controlled by the wireless digital communication system and the communication devices must respond to them according to the corresponding technical specifications of the wireless digital communication system. Both procedures are normally initiated by the wireless digital communication system as a result of a system access originated by a communication device. In most typical signaling cases, the communication device requests a system access, e.g., a call origination or a location update. In the typical authentication case the network will require subscription verification by passing data to be processed by the SIM in the communication device. The communication device then processes the data in the SIM and sends the results to the wireless digital communication system for validation. If the user is "authenticated", the signaling between a communication device and the wireless digital communication system proceeds. If the wireless digital communication system is capable of handling ciphering the signaling will normally be in an encrypted mode. The wireless digital communication system and the user terminal agree upon what encryption parameters to use and the wireless digital communication system is in control of turing the ciphering on and off.

Figure 1:
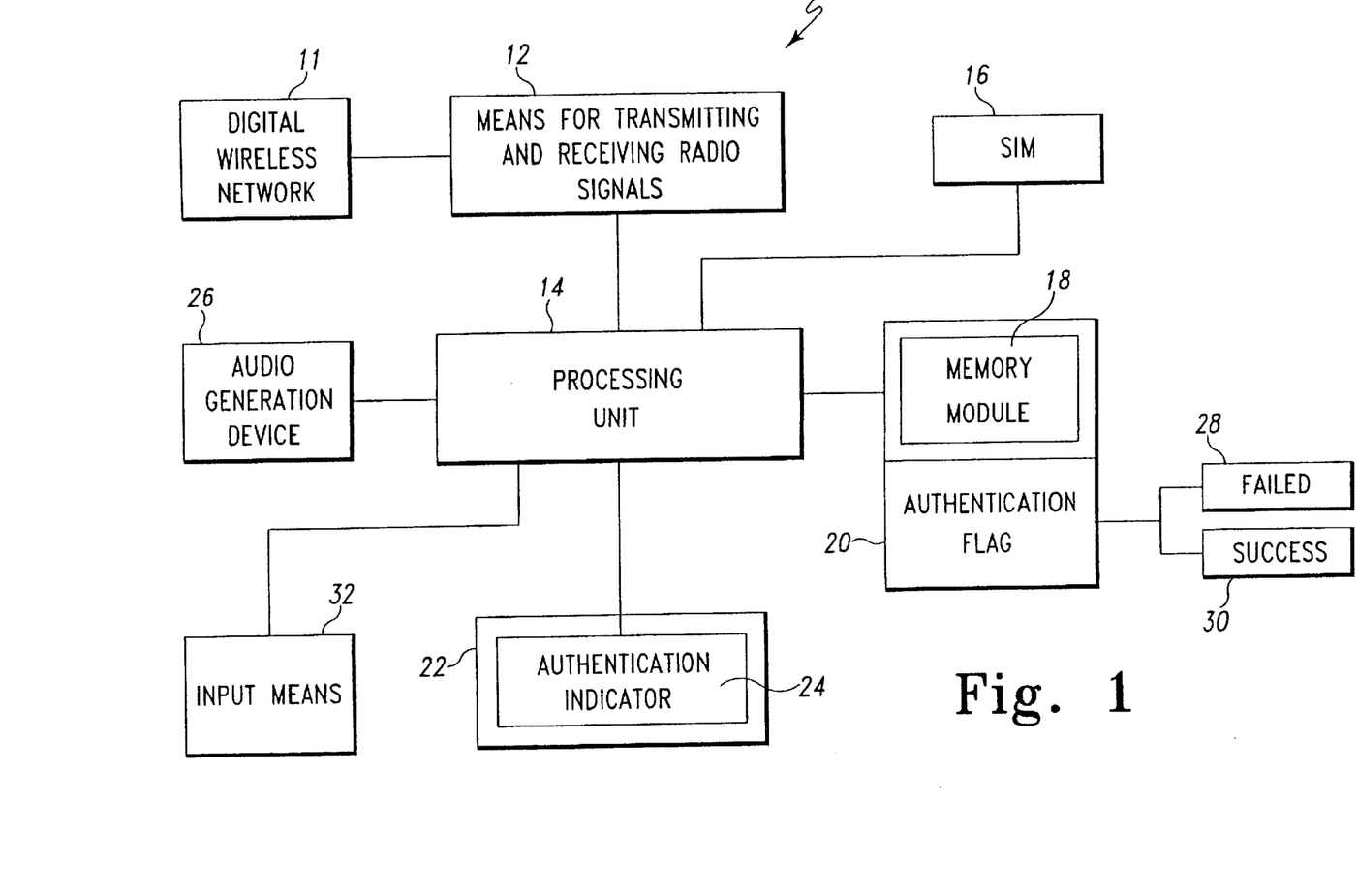
FIG. 1 is a diagrammatic illustration of the authentication features of a preferred communication device.

Referring to FIG. 1, the present invention discloses a method of controlling authentication features in a communication device 10 for a digital wireless network 11. In the invention a means for transmitting and receiving radio signals 12 is connected with a processing unit 14. A SIM 16 is connected with the processing unit 14 for controlling authentication procedures during a system access. A SIM 16 is a specially manufactured chip which contains authentication information and ciphering information for the communication device 10. A memory module 18 is connected with the processing unit 14, the memory module 18 having an authentication flag 20 which is activated when the communication device 10 is authenticated on the digital wireless network 11. A display 22 is provided that is connected with the processing unit 14. During operation an authentication indicator 24 is activated with the processing unit 14 when the authentication flag 20 is active. The authentication flag 20 is active only when the communication device is authenticated.

The authentication indicator 24 may be selected from a variety of different indication means. For instance, the authentication indicator 24 may be a text message, an icon, a light, or an alpha numeric message. Further, the processing unit 14 may use a dedicated audio signal that is generated by an audio generating device 26 to notify a user the communication device 10 is authenticated on the digital wireless network 11. The authentication indicator 24 does not have to be associated with the display 22 and can be generated by various devices as those skilled in the art would recognize. However, in preferred embodiments the authentication indicator 24 would be generated on the display 22. The authentication indicator 24 may also be configurable by an input means 32 to either reflect the status of the authentication flag 20 immediately or at a user's request.

During operation the communication device 10 assigns the authentication flag 20 an authentication failed flag 28 with the processing unit 14 when the digital wireless network 11 rejects an authentication procedure performed by the communication device 10. The authentication failed flag 28 can be programmed to not reset as long as the communication device 10 is serviced by the same digital wireless network 11. The authentication failed flag 28 is stored permanently in the memory module 18 until the communication device 10 is turned off or the SIM 16 is replaced. The authentication flag 20 can be assigned as an authentication success flag 30 with the processing unit 14 when the digital wireless network 11 accepts an authentication procedure performed by the communication device 10. The authentication success flag 30 remains active during a system access unless an authentication procedure fails during the system access. In the invention the authentication flag 20 is not reset as long as the communication device 10 is serviced by the same digital wireless network 11 during a current working session or a single system access.

In the invention, the communication device 10 is provided with an input means 32 for allowing a user to check whether the digital wireless network 11 has authenticated the communication device 10 during a current working session. The processing unit 14 generally controls the overall operations of a communication device 10. Therefore, the user of the communication device 10 would be able to use a key pad or another input device to check whether the communication device 10 is operating authenticated or not authenticated. In addition, the input means 32 allows a user to disable the processing unit 14 from handling authentication information and from activating the authentication flag 20. In addition, the authentication flag 20 may be configurable by the input means 32 to reflect a single system access or a whole working session.

Another preferred embodiment of the present invention discloses a communication device 10 for conducting communication on a digital wireless network 11. In the communication device 10, a means for transmitting and receiving radio signals 12 is connected with a processing unit 14. A SIM module 16 is connected with the processing unit 14 and contains authentication information used by the digital wireless network 11. A memory module 18 is connected with the processing unit 14 and has a reserved memory location for a authentication flag 20. The authentication flag 20 is activated when the digital wireless network 11 has authenticated the communication device 10 after performing an authentication procedure. An authentication indicator 24 is connected with the processing unit 14 and is activated by the processing unit 14 when the authentication flag 20 is activated during a system access. The authentication flag 20 is only active when the communication device 10 is authenticated.

The authentication indicator 24 may be selected from the group including an icon, an alphanumeric message, a light, or a text message. The authentication indicator 24 does not have to be generated with the display 22. The authentication indicator may also comprise an audio signal which is generated by an audio generation device 26. The authentication indicator 24 is configurable by an input means 32 to either reflect the status of the authentication flag 20 immediately, or at a user's request.

During operation, the authentication flag 20 is assigned an authentication failed flag 28 by the processing unit 14 when the digital wireless network 11 rejects an authentication procedure from the communication device 10. The authentication failed flag 28 is stored permanently in the memory module 18 until the communication device 10 is turned off or the SIM 16 is replaced. The authentication failed flag 28 can simply be a valve assigned to the authentication flag 20 or a separate location in the memory module 18. During operation, the authentication flag 20 can also be assigned an authentication success flag 30 by the processing unit 14 when the digital wireless network 11 accepts an authentication procedure performed by the communication device 10. The authentication success flag 30 remains active during a system access unless an authentication procedure fails during the current system access. The authentication failed flag 30 is not reset as long as the communication device 10 is serviced by the same digital wireless network 11 during a current working session.

The communication device 10 is also provided with an input means 32 for allowing a user to check whether the digital wireless network 11 has authenticated the communication device 10 during a current working session. This may be done with the input means 32 which is controlled by the processing unit 14. The input means 32 may also be used by a user to disable the processing unit 14 from handling real-time authentication information and from activating the authentication flag 20. The authentication flag 20 may be configurable by the input means 32 to reflect a single system access or a whole working session.

Figure 2:
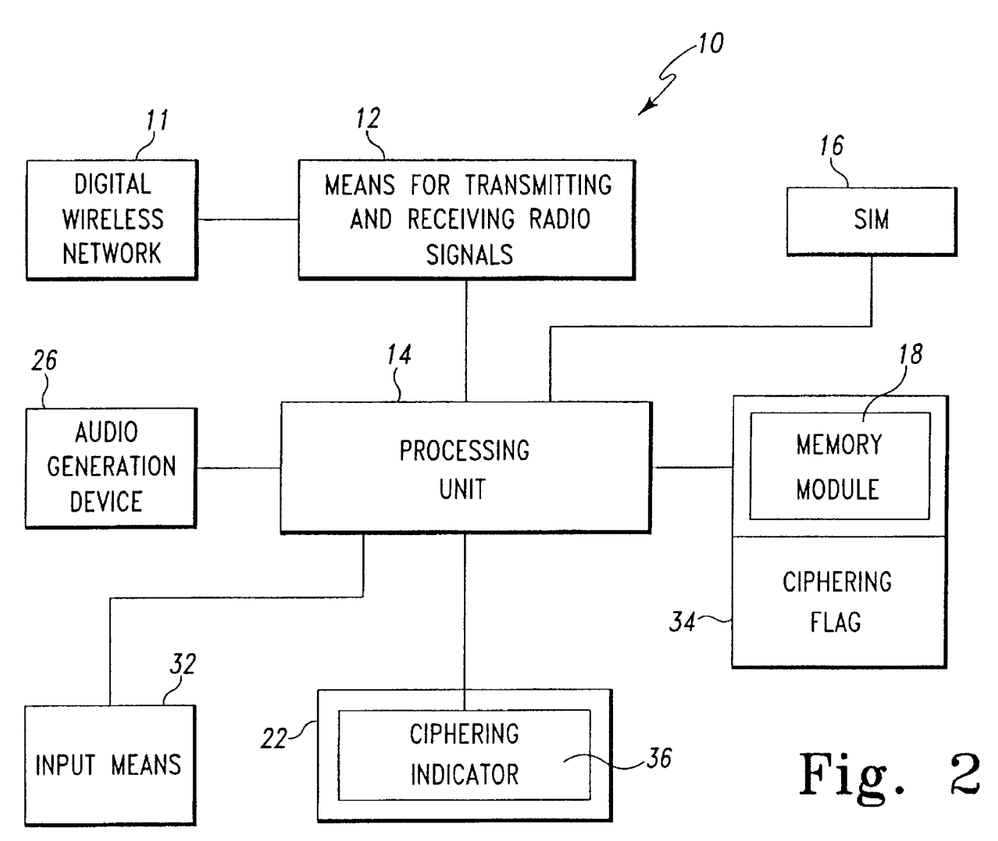
FIG. 2 is a diagrammatic illustration of the ciphering features of the preferred communication device.

Referring to FIG. 2, another preferred embodiment of the present invention discloses a method of controlling ciphering features in a communication device for a digital wireless network 11. In the preferred method, a means for transmitting and receiving radio signals 12 is connected with a processing unit 14. A SIM 16 is connected with the processing unit 14 for controlling ciphering procedures during a system access. A memory module 18 is connected with the processing unit 14, the memory module 18 having a ciphering flag 34 which is activated when the communication device 10 is encrypting data being sent and received over the digital wireless network 11. During operation of the communication device 10, a ciphering indicator 36 is activated with the processing unit 14 when the ciphering flag 34 is activated.

The ciphering indicator 36 may be chosen from the group including a text message, an icon, a light, or an alphanumeric message which may be generated by a display 22. The ciphering indicator 34 may also comprise an audio signal generated by an audio generation device 26. During operation, the communication device 10 is configurable by the input means 32 to either reflect the status of the ciphering flag 34 immediately, or at a user's request. In addition, the input means 32 allows a user to disable the processing unit 14 from the handling the real-time ciphering information procedures and from activating the ciphering flag 34 during a system access is provided in a preferred communication device 10. Optimally, the ciphering flag 34 is configurable by the input means 32 to reflect a single system access or a whole working session.

Another preferred embodiment of the present invention discloses a communication device for conducting radio communication on a digital wireless network 11. The communication device 10 utilizes a means for transmitting and receiving radio signals 12 that is connected with a processing unit 14 to conduct radio communication on the digital wireless network 11. A SIM module 16 is connected with the processing unit 14 and the SIM module contains ciphering information used by the digital wireless network 11 during a system access. A memory module 18 is connected with the processing unit 14 having a reserved memory location for a ciphering flag 34. The ciphering flag 34 is activated when the communication device 10 is encrypting data being sent and received over the digital wireless network 11. A ciphering indicator 36 is provided that is connected with the processing unit 14 and only operates when it is activated by the processing unit 14 when the ciphering flag 34 is activated during a system access. The ciphering flag 34 is activated in successful state only when the communication device 10 is encrypting data being sent and received over the digital wireless network 11.

The ciphering indicator 36 may be selected from the group including an icon, an alphanumeric message, a light, or a text message that may be generated by a display device 22. In addition, the ciphering indicator 36 could comprise an audio signal generated by an audio generation device 26 connected with the processing unit 14. The ciphering indicator 36 may also be configurable to either reflect the status of the ciphering flag 34 immediately or at a user's request. The user utilizes an input means 32 to control the functionality of the ciphering information features.

The input means 32 also allows a user to disable the processing unit 14 from handling real-time ciphering information and from activating the ciphering flag 34 during a system access. In addition, the ciphering flag 34 is configurable by the input means 32 to reflect a single system access or a whole working session. Again, an input means 32, such as a plurality of buttons or a key pad, is used by the user to control the ciphering features of the communication device 10.

Figure 3:
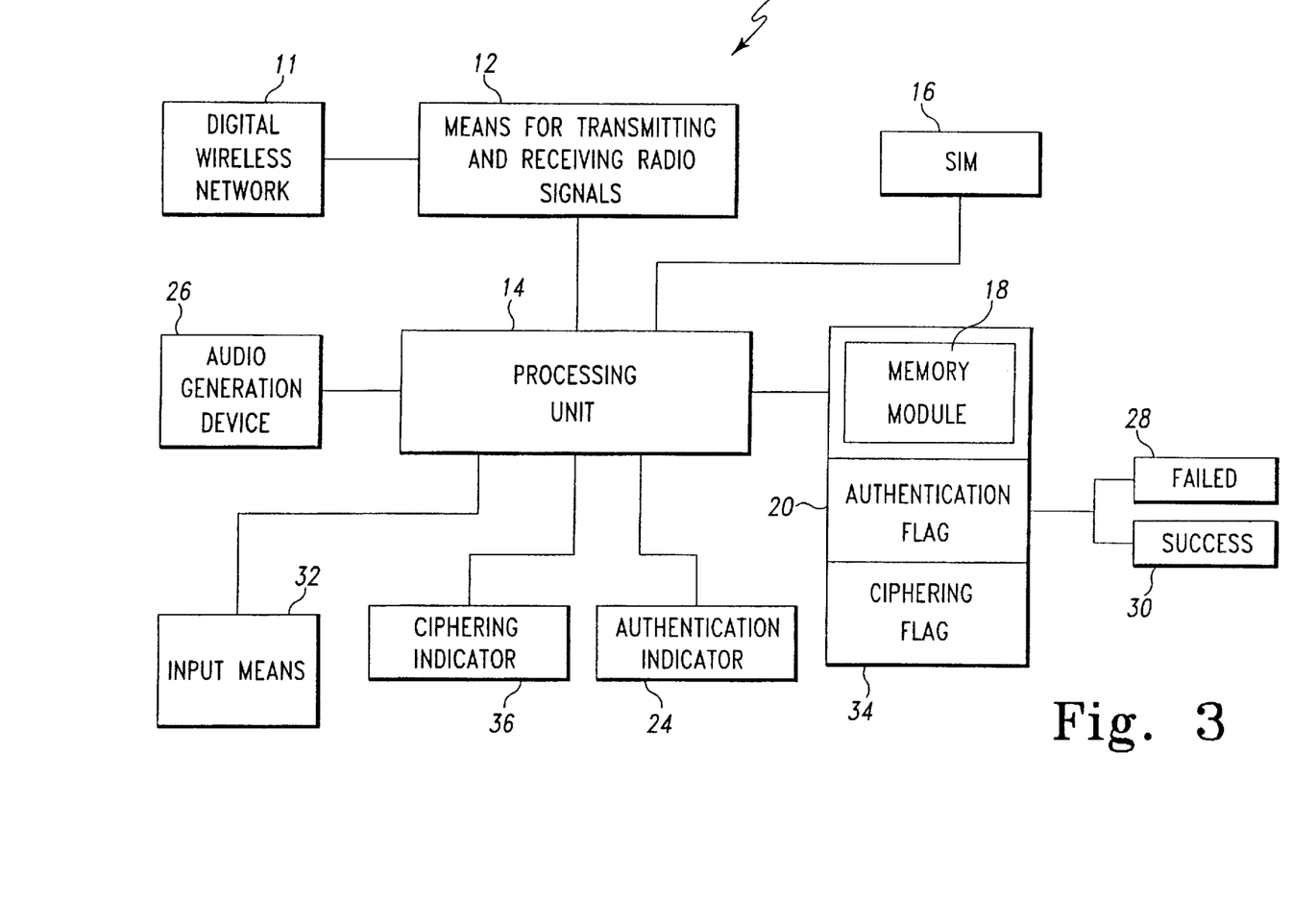
FIG. 3 is a diagrammatic illustration of a preferred communication device illustrating both the authentication and ciphering features.

Referring to FIG. 3, another preferred embodiment of the present invention discloses a method of providing real-time authentication and ciphering information in a communication device 10. The method comprises the steps of providing a processing unit 14 connected with a means for conducting radio communication over a digital wireless network 11; using a SIM 16 connected with the processing unit 14 for controlling authentication procedures and ciphering procedures during a system access; providing a memory module 18 connected with the processing unit 14 having a first memory location reserved for an authentication flag 20 and a second memory location reserved for a ciphering flag 34; activating the authentication flag 20 when the communication device 10 is authenticated on the digital wireless network 11 and the ciphering flag 34 when the communication device 10 is sending and receiving encrypted data over the digital wireless network 11; activating an authentication indicator 24 when the authentication flag 20 is activated by the processing unit 14; and activating a ciphering indicator 36 when the ciphering flag 34 is activated by the processing unit 14.

The authentication indicator 24 and the ciphering indicator 36 may be selected from the group including a text message, an icon, a light, or an alphanumeric message generated by a display device 22. In addition, the authentication indicator 24 and the ciphering indicator 36 may comprise an audio signal generated by an audio generation device 26 connected with the processing unit 14. The authentication indicator 24 and the ciphering indicator 36 are configurable by an input means 32 to select the status of the authentication flag 24 or the ciphering flag 36 immediately or at a user's request. Both the ciphering flag 34 and the authentication flag 20 are configurable by the input means 32 to reflect a single system access or a whole working session.

During operation of the preferred method, the authentication flag 24 is assigned an authentication failed flag 28 by the processing unit 14 when the digital wireless network 11 rejects an authentication procedure performed by the communication device 10. The authentication failed flag 28 can be stored permanently in the memory module 18 until the communication device 10 is turned off or the SIM 16 is replaced. In addition, during operation the authentication flag 20 is assigned an authentication success flag 30 by the processing unit 14 when the digital wireless network 11 accepts an authentication procedure performed by the communication device 10. Normally, the authentication success flag 30 remains active during a system access unless an authentication procedure fails during the current system access. The authentication success flag 30 is not reset as long as the communication device 10 is serviced by the same digital wireless network 11 during a current working session.

In the preferred method, the communication device 10 is provided with an input means 32 enables a user to check whether the digital wireless network 11 has authenticated the communication device 10 during a current working session. The input means 32 may comprise a key pad or one of a plurality of buttons. In the preferred embodiment the input means 32 allows a user to disable the processing unit 14 from handling real-time authentication information procedures and from activating the authentication flag 20. Further, the communication device 10 may be provided with a means for allowing a user to disable the processing unit 14 from handling real-time ciphering information procedures and from activating the ciphering flag 34 during a system access.

Another preferred embodiment of the present invention discloses a communication device 10 for conducting radio communication over a digital wireless network 11. The communication device 10 comprises a processing unit 14 connected with a means for sending and receiving radio signals 12 over a digital wireless network 11; a SIM 16 connected with the processing unit 14, said SIM containing authentication data and ciphering data; a memory module 18 connected with a processing unit 14; a first memory location reserved in the memory module for an authentication flag 20, said authentication flag 20 being activated when the digital wireless network 11 has authenticated the communication device 10 after performing an authentication procedure; a second memory location reserved in the memory module 18 for a ciphering flag 34, said ciphering flag 34 being activated when the communication device 10 is encrypting data being sent and received over the digital wireless network 11; an authentication indicator 24 connected with the processing unit 14, said authentication indicator 24 being activated by the processing unit 14 when the authentication flag 20 is activated during a system access; and a ciphering indicator 36 connected with a processing unit 14, said ciphering indicator 36 being activated by the processing unit 14 when the ciphering flag 34 is activated during a system access.

In the preferred communication device 10, the authentication indicator 24 may be selected from the group including an icon, an alphanumeric message, a light, or a text message generated by a display device 22. The authentication indicator 24 may comprise an audio signal generated by an audio generation device 26 connected with the processing unit 14. The authentication indicator 24 is configurable to either reflect the status of the authentication flag 20 immediately or at a user's request.

During operation of the preferred communication device 10, the authentication flag 20 is assigned an authentication failed flag 28 by the processing unit 14 when the digital wireless network 11 rejects an authentication procedure from the communication device 10. The authentication failed flag 28 may be a value set by the system operator so that they can easily determine why the communication device 10 did not authenticate on the digital wireless network 11. The authentication failed flag 28 may be stored permanently in the memory module 18 until the communication device 10 is turned off or the SIM 16 is replaced. The authentication flag 20 is assigned an authentication success flag 30 by the processing unit 14 when the digital wireless network 11 accepts an authentication procedure performed by the communication device 10. Again, the authentication success flag 30 can be a value set by the digital wireless network 11. The authentication success flag 30 remains active during a system access unless an authentication procedure fails during the current system access. In addition, the authentication success flag 30 is not reset as long as the communication device 10 is serviced by the same digital wireless network 11 during a current working session.

The communication device 10 is also provided with an input means 32 for allowing a user to check whether the digital wireless network 11 has authenticated the communication device 10 during a current working session. Further, the communication device 10 may use the input means 32 for allowing a user to disable the processing unit 14 from handling real-time authentication information and from activating the authentication flag 20. Again, the means for allowing a user to disable the processing unit 14 from handling real-time authentication information may comprise the input means 32.

In the preferred communication device 10, the ciphering indicator 36 may be selected from the group including an icon, an alphanumeric message, a light, or a text message generated by a display device 22. The ciphering indicator 36 may also comprise an audio signal generated by an audio generation 26 connected with the processing unit 14. The ciphering indicator 36 is configurable to either reflect the status of the ciphering flag 34 immediately or at a user's request. In addition, the ciphering flag 36 is configurable by the input means 32 to reflect a single system access or a whole working session. In addition, the input means 32 allows a user to disable the processing unit 14 from handling real-time ciphering information and from activating the ciphering flag 32 during a system access.

Although several preferred embodiments of this invention have been disclosed, one skilled in the art would recognize that the disclosed methods and devices can be utilized in numerous types of communication systems. It is to be understood that a wide range of changes and modifications to the embodiments described above will be apparent to those skilled in the art and are contemplated. It is, therefore, intended that the foregoing detailed description be regarded as illustrative rather than limiting, and that it be understood that it is the following claims, including all equivalents that are intended to define the spirit and scope of this invention.

What is claimed is:

1. A method of controlling authentication features in a communication device for a digital wireless network, comprising the steps of:

provide a means for transmitting and receiving radio signals connected with a processing unit;

using a SIM connected with the processing unit for controlling authentication procedures during a system access;

providing a memory module connected with the processing unit, said memory module having a authentication flag; and activating an authentication indicator with the processing unit when the personal communication device is authenticated on the digital wireless network.

2. The method of claim 1, wherein the authentication indicator may be selected from the group including a text message, an icon, a light, or an alpha-numeric message generated by a display device.

3. The method of claim 1, wherein the authentication indicator comprises a audio signal generated by an audio generation device connected with the processing unit.

4. The method of claim 1, wherein the authentication indicator is configurable by an input means to either reflect the status of the authentication flag immediately or at a users request.

5. The method of claim 1, wherein the authentication flag is assigned an authentication failed indicator by the processing unit when the digital wireless network rejects an authentication procedure performed by the communication device.

6. The method of claim 5, wherein the authentication failed flag is stored permanently in the memory module until the communication device is turned off or the SIM is replaced.

7. The method of claim 5, wherein the authentication failed flag is not reset as long as the communication device is serviced by the same digital wireless network during a current working session.

8. The method of claim 1, wherein the authentication flag is assigned an authentication success flag with the processing unit when the digital wireless network accepts an authentication procedure performed by the communication device.

9. The method of claim 8, wherein the authentication success flag remains active during a system access unless an authentication procedure fails during the current system access.

10. The method of claim 1, wherein the communication device is provided with an input means for allowing a user to check whether the digital wireless network has authenticated the communication device during a current working session.

11. The method of claim 1, further comprising the step of providing an input means for allowing a user to disable the processing unit from handling real-time authentication information and from activating the authentication flag.

12. The method of claim 1, wherein the authentication flag is configurable by an input means to reflect a single system access or a whole working session.

13. A communication device for conducting radio communication on a digital wireless network, comprising:
   means for transmitting and receiving radio signals connected with a processing unit;
   a SIM module connected with the processing unit, said SIM module containing authentication information used by the digital wireless network;
   a memory module connected with the processing unit, said memory module having a reserved memory location for an authentication flag; and
   an authentication indicator connected with the processing unit, said authentication indicator being activated by the processing unit when the personal communication device is authenticated on the digital wireless network.

14. The communication device of claim 13, wherein the authentication indicator may be selected from the group including an icon, an alpha-numeric message, a light, or a text message.

15. The communication device of claim 13, wherein the authentication indicator comprises an audio signal generated by an audio generation device connected with the processing unit.

16. The communication device of claim 13, wherein the authentication indicator is configurable to either reflect the status of the authentication flag immediately or at a user's request.

17. The communication device of claim 13, wherein the authentication flag is assigned an authentication failed flag by the processing unit when the digital wireless network rejects an authentication procedure from the communication device.

18. The communication device of claim 17, wherein the authentication failed flag is stored permanently in the memory module until the communication device is turned off or the SIM is replaced.

19. The communication device of claim 17, wherein the authentication failed flag is not reset as long as the communication device is serviced by the same digital wireless network during a current working session.

20. The communication device of claim 13, wherein the authentication flag is assigned an authentication success flag by the processing unit when the digital wireless network accepts an authentication procedure performed by the communication device.

21. The communication device of claim 20, wherein the authentication success flag remains active during a system access unless an authentication procedure fails during the current system access.

22. The communication device of claim 13, wherein the communication device is provided with an input means for allowing a user to check whether the digital wireless network has authenticated the communication device during a current working session.

23. The communication device of claim 13, further comprising an input means for allowing a user to disable the processing unit from handling real-time authentication information and from activating the authentication flag connected with the processing unit.

24. The communication device of claim 13, wherein the authentication flag is configurable by an input means to reflect a single system access or whole working session.

25. A method of controlling ciphering features in a communication device for a digital wireless network, comprising the steps of:
   providing a means for transmitting and receiving radio signals connected with processing unit;
   utilizing a SIM connected with the processing unit for controlling ciphering procedures during a system access;
   providing a memory module connected with the processing unit, said memory module having a ciphering flag which is activated when the personal communication device is encrypting data being sent and received over the digital wireless network;
   activating a ciphering indicator with the processing unit when the ciphering flag is activated; and
   providing an input means for allowing a user to disable the processing unit from handling real-time ciphering information procedures and from activating the ciphering flag during a system access.

26. A communication device for conducting radio communication on a digital wireless network, comprising:
   means for transmitting and receiving radio signals connected with a processing unit;
   a SIM module connected with the processing unit, said SIM module containing ciphering information used by the digital wireless network during a system access;
   a memory module connected with the processing unit having a reserved memory location for a ciphering flag, said ciphering flag being activated when the communication device is encrypting data being sent and received over the digital wireless network;
   a ciphering indicator connected with the processing unit, said ciphering indicator being activated by the processing unit when the ciphering flag is activated during a system access; and
   an input means for allowing a user to disable the processing unit from handling real-time ciphering information and from activating the ciphering flag during a system access.

27. A method of providing real-time authentication and ciphering information in a communication device, comprising the steps of:
   providing a processing unit connected with a means for conducting radio communication over a digital wireless network;

using a SIM connected with the processing unit for controlling authentication procedures and ciphering procedures during a system access;

providing a memory module connected with the processing unit, said memory module having a first memory location reserved for an authentication flag and a second memory location reserved for a ciphering flag;

activating an authentication indicator when the communication device is authenticated on the digital wireless network; and activating a ciphering indicator when the communication device is encrypting data being sent and received over the digital wireless network.

28. The method of claim 27, wherein the authentication indicator may be selected from the group including a text message, an icon, a light, or an alphanumeric message generated by a display device.

29. The method of claim 27, wherein the authentication indicator comprises an audio signal generated by an audio generation device connected with the processing unit.

30. The method of claim 27, wherein the authentication indicator is configurable by an input means to either reflect the status of the authentication flag immediately or at a users request.

31. The method of claim 27, wherein the ciphering indicator may be selected from the group including a text message, an icon, a light, or an alphanumeric message generated by a display device.

32. The method of claim 27, wherein the ciphering indicator comprises an audio signal generated by an audio generation device connected with the processing unit.

33. The method of claim 27, wherein the ciphering indicator is configurable by an input means to either reflect the status of the ciphering flag immediately or at a users request.

34. The method of claim 27, wherein the ciphering flag is configurable by an input means to reflect a single system access or whole working session.

35. The method of claim 27, wherein the authentication flag is configurable by an input means to reflect a single system access or a whole working session.

36. The method of claim 27, wherein the authentication flag is assigned a authentication failed flag by the processing unit when the digital wireless network rejects an authentication procedure performed by the communication device.

37. The method of claim 36, wherein the authentication failed flag is stored permanently in the memory module until the communication device is turned off or the SIM is replaced.

38. The method of claim 27, wherein the authentication flag is assigned an authentication success flag by the processing unit when the digital wireless network accepts an authentication procedure performed by the communication device.

39. The method of claim 38, wherein the authentication success flag remains active during a system access unless an authentication procedure fails during the current system access.

40. The method of claim 38, wherein the authentication success flag is not reset as long as the communication device is serviced by the same digital wireless network during a current working session.

41. The method of claim 27, wherein the communication device is provided with an input means for allowing a user to check whether the digital wireless network has authenticated the communication device during a current working session.

42. The method of claim 27, further comprising the step of providing an input means for allowing a user to disable the processing unit from handling real-time authentication information procedures and from activating the authentication flag.

43. The method of claim 27, further comprising the step of providing an input means for allowing a user to disable the processing unit from handling real-time ciphering information procedures and from activating the ciphering flag during a system access.

44. A communication device for conducting radio communication over a digital wireless network, comprising:

a processing unit connected with a means for sending and receiving radio signals over a digital wireless network;

a SIM connected with the processing unit, said SIM containing authentication data and ciphering data;

a memory module connected with the processing unit, said memory module having a first memory location reserved for an authentication flag and a second memory location reserved for a ciphering flag;

an authentication indicator connected with the processing unit, said authentication indicator being activated by the processing unit when the communication device is authenticated on the digital wireless network; and a ciphering indicator connected with the processing unit, said ciphering indicator being activated by the processing unit when the communication device is sending or receiving encrypted data from the digital wireless network.

45. The communication device of claim 44, wherein the authentication indicator may be selected from the group including an icon, an alpha-numeric message, a light, or a text message generated by a display device.

46. The communication device of claim 44, wherein the authentication indicator comprises an audio signal generated by an audio generation device connected with the processing unit.

47. The communication device of claim 44, wherein the authentication indicator is configurable by an input means to either reflect the status of the authentication flag immediately or at a users request.

48. The communication device of claim 44, wherein the authentication flag is assigned a authentication failed flag by the processing unit when the digital wireless network rejects a authentication procedure from the communication device.

49. The communication device of claim 48, wherein the authentication failed flag is stored permanently in the memory module until the communication device is turned off or the SIM is replaced.

50. The communication device of claim 44, wherein the authentication flag is assigned an authentication success flag by the processing unit when the digital wireless network accepts an authentication procedure performed by the communication device.

51. The communication device of claim 50, wherein the authentication success flag remains active during a system access unless an authentication procedure fails during the current system access.

52. The communication device of claim 50, wherein the authentication success flag is not reset as long as the communication device is serviced by the same digital wireless network during a current working session.

53. The communication device of claim 44, wherein the communication device is provided with an input means for allowing a user to check whether the digital wireless network has authenticated the communication device during a current working session.

54. The communication device of claim 44, further comprising an input means for allowing a user to disable the processing unit from handling real-time authentication information and from activating the authentication flag.

55. The communication device of claim 44, wherein the ciphering indicator may be selected from the group including an icon, an alpha-numeric message, a light, or a text message generated by a display device.

56. The communication device of claim 44, wherein the ciphering indicator comprises an audio signal generated by an audio generation device connected with the processing unit.

57. The communication device of claim 44, wherein the authentication flag is configurable by an input means to reflect a single system access or whole working session.

58. The communication device of claim 44, wherein the ciphering indicator is configurable by an input means to either reflect the status of the ciphering flag immediately or at a users request.

59. The communication device of claim 44, wherein the ciphering flag is configurable by input mean to reflect a single system access or whole working session.

60. The communication device of claim 44, wherein the communication device is provided with an input means for allowing a user to disable the processing unit from handling real-time ciphering information and from activating the ciphering flag during a system access.

* * * * *

UNITED STATES PATENT AND TRADEMARK OFFICE
CERTIFICATE OF CORRECTION

PATENT NO. : 6,356,753 B1
DATED : March 12, 2002
INVENTOR(S) : Javor Kolev and Aaron Cubbage

It is certified that error appears in the above-identified patent and that said Letters Patent is hereby corrected as shown below:

<u>Title page,</u>
Below item [76], insert the following:

-- [73] Assignee: Ericsson Inc.,
Research Triangle Park, NC (US) --

Signed and Sealed this

Eleventh Day of March, 2003

JAMES E. ROGAN
*Director of the United States Patent and Trademark Office*